United States Patent
Shapiro

[19]

[11] Patent Number: 6,089,707
[45] Date of Patent: Jul. 18, 2000

[54] CONVERTIBLE EYEGLASSES

[76] Inventor: Sam Shapiro, 163 Urick La., Monroeville, Pa. 15146

[21] Appl. No.: 09/400,335

[22] Filed: Sep. 21, 1999

[51] Int. Cl.[7] .......................................................... G02C 9/00
[52] U.S. Cl. ................................................. 351/47; 351/57
[58] Field of Search .................................. 351/47, 57, 48, 351/58, 41, 122, 111, 158, 44

[56] References Cited

U.S. PATENT DOCUMENTS

| | | | |
|---|---|---|---|
| 4,196,981 | 4/1980 | Waldrop | 351/59 |
| 5,321,442 | 6/1994 | Albanese | 351/44 |
| 5,416,537 | 5/1995 | Sadler | 351/57 |
| 5,568,207 | 10/1996 | Chao | 351/57 |
| 5,642,177 | 6/1997 | Nishioka | 351/47 |
| 5,696,571 | 12/1997 | Spencer et al. | 351/47 |
| 5,737,054 | 4/1998 | Chao | 351/47 |
| 5,867,244 | 2/1999 | Martin | 351/47 |
| 5,877,838 | 3/1999 | Chao | 351/47 |
| 5,882,101 | 3/1999 | Chao | 351/47 |
| 5,883,688 | 3/1999 | Chao | 351/47 |
| 5,929,964 | 7/1999 | Chao | 351/47 |

FOREIGN PATENT DOCUMENTS

| | | |
|---|---|---|
| 2223295 | 7/1999 | Canada . |
| 2235917 | 8/1999 | Canada . |

*Primary Examiner*—Hung Xuan Dang
*Attorney, Agent, or Firm*—Metz Schermer & Lewis LLC; Thomas Lizzi; Leland P. Schermer

[57] ABSTRACT

The invention comprises an eyeglass set comprising framed eyeglasses, framed sunglasses which can be detachably attached to the eyeglass frames, and coverlets which can be detachably attached to the temples of the eyeglass frames. The eyeglass frame has left and right temples pivotally attached to a front portion which holds a pair of eyeglass lenses. The sunglass frame holds a pair of sunglass lenses and contains a resilient bridge clip and a plurality of resilient retainer clips arranged so that the bridge clip and retainer clips cooperate to permit the sunglass frame to be detachably attached to the eyeglass frame. Each of the right and left temple coverlets has a channel for receiving, respectively, the right and left temples of the eyeglass frame and at least one magnet disposed so as to permit the coverlet to be detachably attached to its respective eyeglass temple.

4 Claims, 1 Drawing Sheet

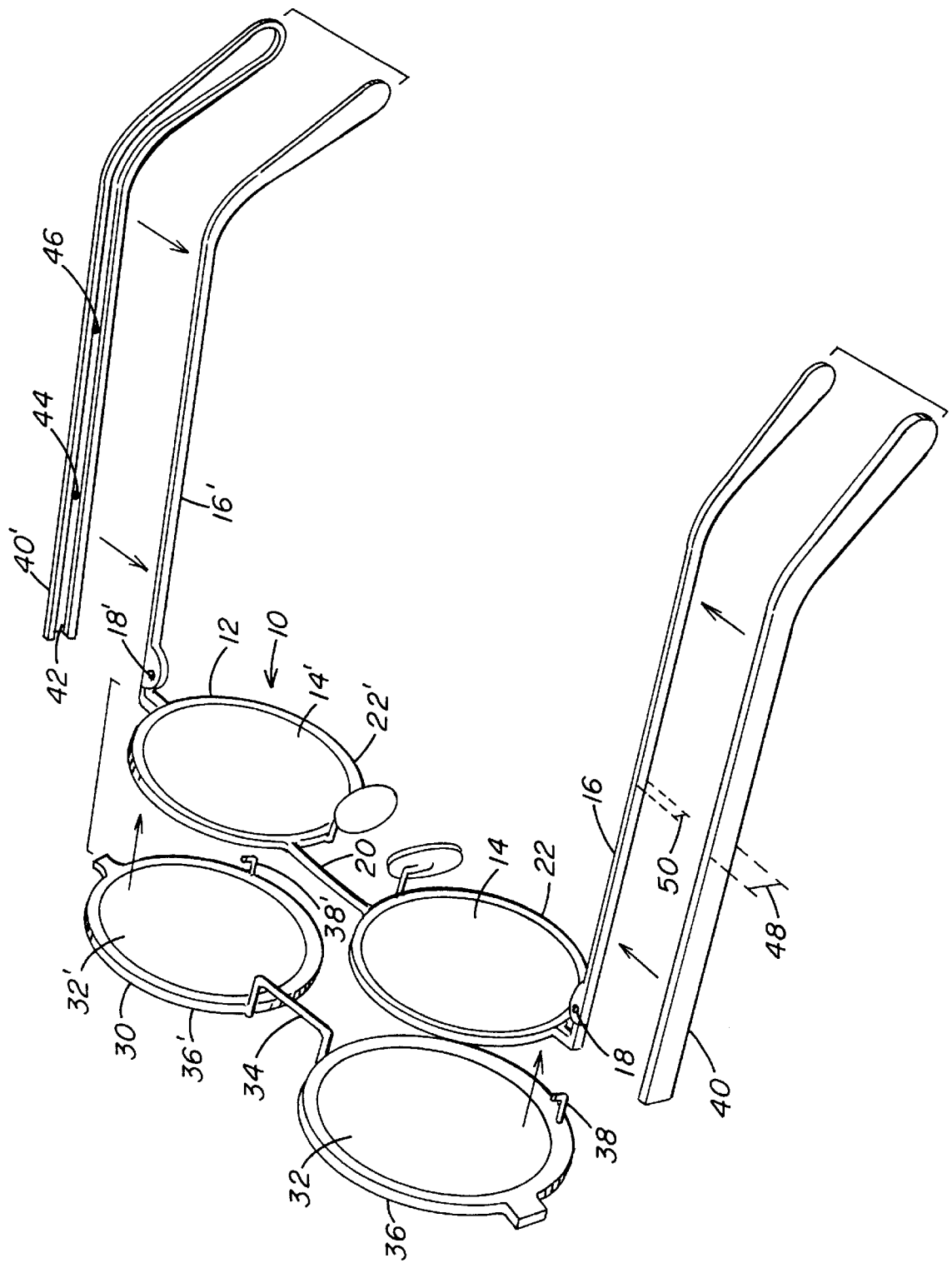

CONVERTIBLE EYEGLASSES

FIELD OF THE INVENTION

The invention relates to clip-on type sunglasses. More particularly, the invention relates to an eyeglass set comprising framed eyeglasses, framed sunglasses which can be detachably attached to the eyeglass frames, and coverlets which can be detachably attached to the temples of the eyeglass frames.

BACKGROUND OF THE INVENTION

In the past, a variety of clip-on type sunglasses have been developed to reversibly convert ordinary eyeglasses to sunglasses. Examples of such clip-on type sunglasses are described in U.S. Pat. No. 5,696,571 issued Dec. 9, 1997, to Jack N. Spencer et al. and U.S. Pat. No. 5,642,177 issued Jun. 24, 1997, to Takahiro Nishioka.

However, while the utilitarian prior art has provided the eyeglass wearer with relief from the glare of the sun, it has done so at the expense of aesthetics. Clip-on sunglasses typically give the wearer the unattractive appearance of having hardware attached to the front of his or her eyeglasses thus compromising the stylishness of the wearer's eyeglass frames.

SUMMARY OF THE INVENTION

It is an object of the present invention to provide an eyeglass wearer with detachable sunglasses which do not sacrifice fashion to utility.

The present invention overcomes the aesthetic disadvantages of the prior art by providing an eyeglass set which converts ordinary eyeglasses to sunglasses stylishly.

The present invention comprises an eyeglass set which includes framed eyeglasses, framed sunglasses which detachably attach to the eyeglass frames, and coverlets which detachably attach to the temples of the eyeglass frames. The design of the sunglass frame and the design of the temple coverlets are preferably coordinated to give a unified, stylish look to the sunglass conversion of the eyeglasses.

The present invention comprises an eyeglass frame having left and right temples pivotally attached to a front portion which holds a pair of eyeglass lenses. As used herein, the terms "left" and "right" relate to the perspective of the eyeglass wearer while wearing the eyeglasses. The present invention further comprises a sunglass frame and left and right temple coverlets. The sunglass frame holds a pair of sunglass lenses. The sunglass frame contains a resilient bridge clip and a plurality of resilient retainer clips arranged so that the bridge clip and retainer clips cooperate to permit the sunglass frame to be detachably attached to the eyeglass frame. Each of the right and left temple coverlets has a channel for receiving, respectively, the right and left temples of the eyeglass frame and also has at least one magnet disposed so as to permit the coverlet to be detachably attached to its respective eyeglass temple.

These and other features and advantages inherent in the subject matter claimed and disclosed will become apparent to those skilled in the art from the following detailed description of presently preferred embodiments thereof and from the appended drawing.

BRIEF DESCRIPTION OF THE DRAWINGS

The drawing is provided only as an aid in understanding the present invention and its use. It is to be understood, therefore, that the drawing is provided solely for the purpose of illustration and not as a definition of the limits of the present invention.

FIG. 1 illustrates an exploded perspective view of an eyeglass set according to an embodiment of the present invention.

DETAILED DESCRIPTION OF PREFERRED EMBODIMENTS

An embodiment of the present invention is illustrated in the FIGURE. As shown in the FIGURE, eyeglass frame 10 comprises a front portion 12, a pair of eyeglass lenses 14, 14', left and right temples 16,16', and left and right hinges 18,18'. Front portion 12 holds the pair of eyeglass lenses 14, 14' in spatial alignment with respect to each other and, during use, also with respect to the eyes of the eyeglass wearer. Front portion 12 includes bridge section 20 connecting left and right eyeglass rim sections 22, 22'. Left and right temples 16, 16' are pivotally attached to front portion 12 by, respectively, left and right hinges 18, 18' thereby allowing left and right temples 16, 16' to be folded inwardly to make eyeglass frame 10 more compact when not in use. The front portion 12 and the left and right temples 16, 16' are preferably made of metal but may be made of any material or combination of materials known to one skilled in the art. As described further below, however, it is important that at least a portion of the left and right temples 16, 16' comprise a magnetically attractable material.

The embodiment also includes sunglass frame 30 which comprises a pair of sunglass lenses 32, 32', bridge clip 34, left and right sunglass rim sections 36, 36', and left and right retainer clips 38, 38'. Sunglass frame 30 holds the pair of sunglass lenses 32, 32' in spatial alignment with respect to each other and, during use, with respect to eyeglass lenses 14, 14'. Sunglass lenses 32, 32' may be made of any of sunglass known to one skilled in the art but are preferably of a type having a coating that restricts the transmission of ultraviolet radiation. The sunglass rim sections 36, 36' are preferably made of plastic material and are most preferably made of zyl.

Bridge clip 34 connects left and right sunglass rim sections 36, 36'. Bridge clip 34 and left and right retainer clips 38, 38' cooperate to permit sunglass frame 30 to be detachably attached to eyeglass frame front portion 12. Bridge clip 34 may be any type of a resilient metal clip known to one skilled in the art that is adaptable to releasably engaging eyeglass frame bridge section 20 so as to aid in the retention of sunglass frame 30 to eyeglass front portion 12.

In this embodiment, left and right retainer clips 38, 38' rearwardly extend, respectively, from the lower part of the rear-faces of left and right sunglass rim sections 36, 36'. In use, left and right retainer clips 38, 38', respectively, engage left and right eyeglass rim sections 22, 22' to mechanically attach sunglass frame 30 to eyeglass frame 10. Left and right retainer clips 38, 38' preferably have a hook-shape and are made of a resilient metal. However, they may be any resilient clip of any material and design known to one skilled in the art that is capable of being adapted to releasably engage right and left eyeglass rim sections 22, 22' so as to cooperate with bridge clip 34 to detachably attach sunglass frame 30 to eyeglass front portion 12. The present invention contemplates that each of the retainer clips extend from the lower rear face or the bottom of the respective sunglass rim at a location that is outward from the sunglass rim's horizontal center.

The embodiment also includes left and right temple coverlets 40, 40'. Left and right temple coverlets 40, 40', respectively, detachably attach to, and cover the outer faces of, left and right temples 16, 16'. The use of left and right coverlets 40, 40' contributes to the aesthetic appearance of the sunglass conversion, especially when viewed from the side. The temple coverlets are preferably made of plastic material and are most preferably made of zyl. Each of the temple coverlets contains a channel for receiving its respective temple. For example, right temple coverlet 40' contains a channel 42 for receiving right temple 16'. The present invention contemplates that at least a portion of the eyeglass left and right temples comprises a magnetically attractable material. Each of the left and right temple coverlets 40, 40' contains at least one magnet disposed so as to permit the temple coverlet to be detachably attached to its respective temple such that the magnet magnetically couples with the magnetically attractable material in the temple with sufficient strength to hold the temple coverlet in place. For example, first and second magnets 44, 46 are disposed in the outer wall of channel 42 to allow right temple coverlet 40' to be detachably attached to eyeglass right temple 16'. The strength, number, size, and location of the magnets disposed in each temple coverlet are selected so as to provide sufficient holding power to retain the temple coverlet in place during normal casual wear.

The conversion of the eyeglasses to sunglasses in this embodiment is accomplished by attaching sunglass frame 30 to eyeglass front portion 12 and by attaching the left and right coverlets 40, 40', respectively, to left and right temples 16, 16'. Attachment of sunglass frame 30 to eyeglass front portion 12 is accomplished by first hooking left and right retainer clips 38, 38', respectively, around the lower periphery eyeglass left and right rim sections 22, 22', then rotating sunglass frame 30 into frontal alignment with eyeglass front portion 12 while lifting or forcing resilient bridge clip 34 over and around bridge section 20 so that bridge clip 34 snaps into locking engagement with bridge section 20. The left and right temples coverlets 40, 40' are then made to cover, respectively, left and right temples 16, 16' by fitting left and right temples 16, 16' into the channels of the respective temple coverlets. The left and right temple coverlets 40, 40' are held in place by the magnetic coupling of the magnets in the temple coverlets with the magnetically attractive material of the temples. Reconversion of the sunglasses to the eyeglasses is accomplished by reversing the described procedure.

Preferably, the designs of the temple coverlets and the sunglass frame complement each other so as to make a unified fashion statement. It is therefore preferable, although not absolutely necessary, that the sunglass frames and the temple coverlets substantially cover the outward facing surfaces of the eyeglasses so as to give the appearance that the wearer is wearing a pair of stylish sunglasses. In a preferred embodiment, the eyeglass frames are of a sleek design and the sunglass frame and temple coverlets combine to give the sunglass conversion a wider, stylish look. The ratio of the thickness in a vertical plane of the temple coverlets with relation to that of the temples may have any value so long as the temple coverlets are of sufficient thickness to cover their respective temples. Preferably, however, the temple coverlets have at some point a thickness that is about three times the thickness of its respective temple's thickness at a corresponding location. For example, referring to the FIGURE, left temple coverlet 40 has a thickness 48 in a vertical plane that is about three times the thickness 50 of left temple 16 at the location where left temple coverlet 40 covers the portion of left temple 16 having thickness 50.

Having described presently preferred embodiments of the present invention, it is to be understood that the present invention may be otherwise embodied within the scope of the appended claims. Thus, while only a few embodiments of the present invention have been shown and described, it will be obvious to those skilled in the art that many changes and modifications may be made thereunto without departing from the spirit and scope of the present invention as described in the appended claims.

What is claimed is:

1. An eyeglass set comprising:
   a) an eyeglass frame having a front portion, a left temple, and a right temple, said front portion holding a pair of eyeglass lenses, and said left and right temples being pivotally attached to said front portion and comprising magnetically attractive material;
   b) a sunglass frame holding a pair of sunglass lenses, said sunglass frame having a resilient bridge clip and a plurality of resilient retainer clips, said bridge clip and said retainer clips cooperating to permit said sunglass frame to detachably attach to said front portion;
   c) a left temple coverlet having a channel for receiving said left temple and further having at least one magnet disposed so as to permit said left temple coverlet to detachably attach to said left temple by magnetic coupling with magnetically attractive material of said left temple; and
   d) a right temple coverlet having a channel for receiving said right temple and further having at least one magnet disposed so as to permit said right temple coverlet to detachably attach to said right temple by magnetic coupling with magnetically attractive material of said right temple;
   whereby said eyeglass frame may be reversibly converted to a pair of sunglasses by attaching to said eyeglass frame said sunglass frame, said left temple coverlet and said right temple coverlet.

2. The eyeglass set described in claim 1 wherein said sunglass frame further comprises a left and a right rim made of zyl.

3. The eyeglass set described in claim 1 wherein at least one of said left and right temple coverlets is made of zyl.

4. The eyeglass set described in claim 1 wherein at least one of said left and right temple coverlets has a thickness in a vertical plane that is about three times the thickness of its respective temple.

* * * * *

UNITED STATES PATENT AND TRADEMARK OFFICE
CERTIFICATE OF CORRECTION

PATENT NO. : 6,089,707
DATED : July 18, 2000
INVENTOR(S) : Sam Shapiro

It is certified that error appears in the above-indentified patent and that said Letters Patent is hereby corrected as shown below:

Column 3, line 32, "eyeglass" should read -- of eyeglass --.

Signed and Sealed this

Third Day of April, 2001

*Attest:*

NICHOLAS P. GODICI

*Attesting Officer*  *Acting Director of the United States Patent and Trademark Office*